March 28, 1967  J. T. UNDERWOOD  3,311,069
METHOD AND DEVICE FOR SECURING UNIFORMITY
IN THICKNESS OF A COOKIE DOUGH SHEET
Filed Oct. 1, 1964
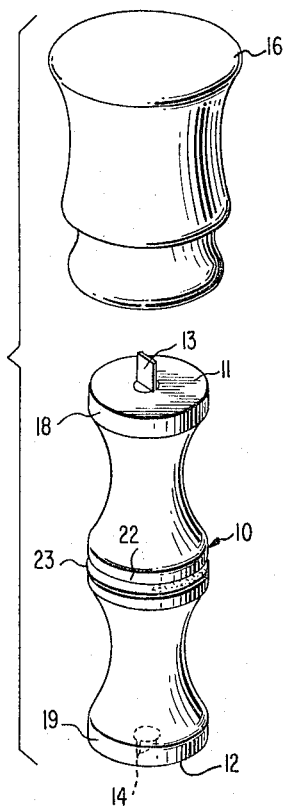
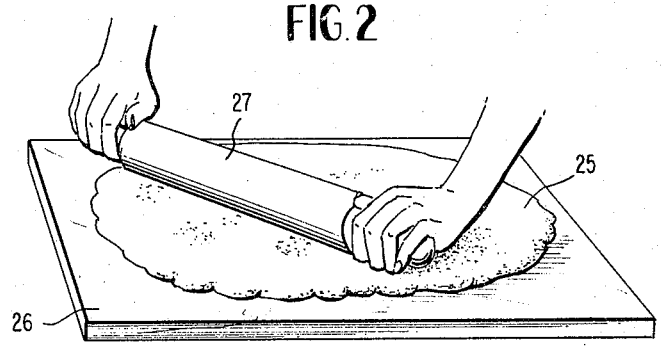
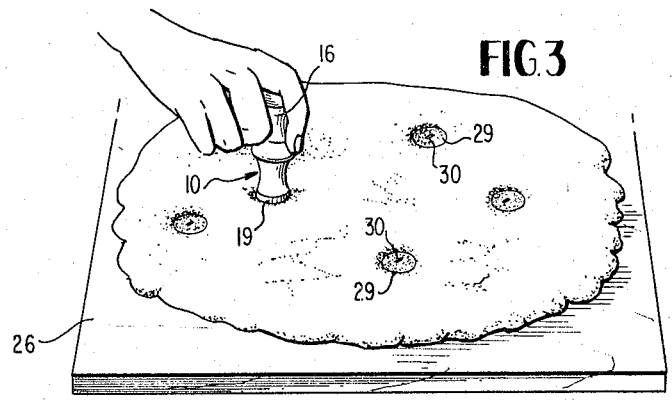
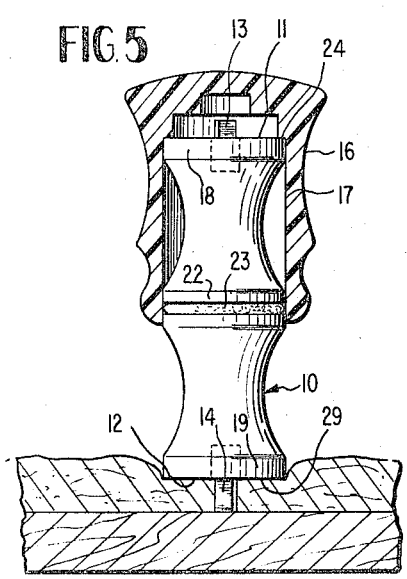
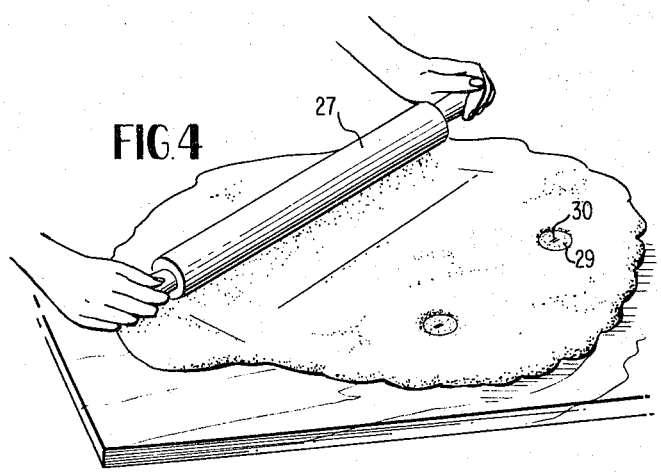
INVENTOR
JAMES T. UNDERWOOD
BY Baldwin & Wight
ATTORNEYS United States Patent Office 3,311,069
Patented Mar. 28, 1967

3,311,069
METHOD AND DEVICE FOR SECURING UNIFORMITY IN THICKNESS OF A COOKIE DOUGH SHEET
James T. Underwood, San Diego, Calif., assignor of one-half to H. H. Renneker Co., Inc., San Diego, Calif., a corporation of California
Filed Oct. 1, 1964, Ser. No. 400,698
10 Claims. (Cl. 107—47)

This invention relates to a method and device for securing uniformity in thickness of a cookie dough sheet, although it will become apparent that the method and device are applicable for securing the same results with pie dough and the like.

Particularly in the baking of cookies in the home, it is desirable that the dough be of uniform thickness. The dough is usually rolled out by hand to an approximate desired thickness which is not uniform, whereupon a cookie cutter is used to cut the individual cookies for baking. The raw cookies which are cut from thinner dough frequently are overbaked in the oven, while those cut from thicker portions of the dough may be underdone and not of the best texture and taste.

An important object in the present invention is to provide a novel method of assisting in providing a dough sheet, particularly for cookies, which will be of uniform thickness throughout its area so that all of the cookies baked from the dough sheet will be of uniform high quality.

A further object is to provide such a method wherein different small areas of the dough sheet are gauged to the proper thickness by providing spaced indentations therein, the thickness of the dough sheet within the areas of such indentations being the desired final uniform thickness of the dough sheet, these indentations permitting the operator then to roll the dough down uniformly to the thickness of the sheet within the areas of the indentations.

A further object is to provide a novel device for carrying out the method, the device being of such nature that when pressed over different spots spaced from each other over the area of the dough sheet, the indentations referred to will be formed, whereupon the dough sheet can be further rolled to reduce the sheet to a uniform thickness, as referred to above.

A further object is to provide a device of the character referred to wherein a portion of the device of appreciable area forms the gauging indentations, and wherein a projection of very small area penetrates the dough sheet and engages the supporting surface for the dough sheet so that the dough sheet within the area of each indentation will be of the desired final thickness of the dough sheet before the cookies are cut therefrom.

A further object is to provide a device of this nature wherein an elongated body is provided at opposite ends with indentation-forming ends and wherein the two ends are provided with dough-penetrating elements of different lengths so that the gauging indentations may be varied according to the desired thickness of the final dough sheet, depending upon the nature of the cookies to be baked.

A further object is to provide a hollow handle or knob to selectively frictionally receive one of said ends of the body to hold it in position for the depression-forming operation, the body being reversible in the handle, depending upon which end of the body is to be used for forming the depressions or indentations.

In the drawing I have shown one embodiment of the invention. In this showing

FIGURE 1 is a perspective view of the two main units of the device, shown separated;

FIGURE 2 is a perspective view of a board on which dough is being initially rolled out prior to the practicing of the method and the use of the device;

FIGURE 3 is a similar view showing the method of forming the indentations in the dough;

FIGURE 4 is a similar view showing the final dough-rolling operation after the indentations have been formed, and FIGURE 5 is a sectional view showing the device in use, the supporting board and dough sheet being fragmentarily shown and the body of the device being shown in elevation.

In the practice of the method, the operator will place a piece of dough on the supporting board and will roll it out to an approximate thickness slightly but definitely greater than the thickness of the desired final dough sheet, this operation being shown in FIGURE 1. Depressions, further described below, are then formed at spaced points over the area of the dough with the flat bottoms of the depressions parallel to and spaced from the supporting board the desired thickness of the finished dough sheet. This step in the method is shown in FIGURE 3. The operator will thereupon further roll the dough as shown in FIGURE 4 going back and forth over the dough sheet until the depressions just disappear. This final rolling operation is shown in FIGURE 4, and when such operation is completed, the top surface of the dough sheet throughout its area will be in the common plane of the bottoms of the depressions so that the dough sheet will be of uniform thickness equal to the thickness of the dough sheet within the area of each depression. Individual cookies are then cut from the sheet in accordance with conventional practice. Cutters of different shape may be used as will be obvious, and each cookie thus cut will be of the desired thickness for proper baking of the cookies so that all will come from the oven uniformly baked.

The device used in the practice of the method comprises a double spool-like body 10, which may be formed of any desired material, such as molded plastic. The ends 11 and 12 of the body are the depression-forming surfaces and they are respectively provided with small, preferably metallic gauging elements 13 and 14, having their inner ends molded in the plastic body. The gauging elements 13 and 14 are preferably arranged axially of the body 10 and are of different lengths, according to the desired final thickness of the dough sheet, as described below.

An operating handle or knob 16 is provided for the device and is provided with an axial recess 17 fitting either end portion of the body 10. These end portions, carrying the surfaces 11 and 12, are of circular cross-section, and are indicated respectively by the numerals 18 and 19, these end portions obviously corresponding in diameter to the recess 17 so as to fit therein. Centrally of the length thereof, the body is provided with a similar circular portion 22 grooved to receive an O-ring 23 which, when one end of the body is inserted in the recess 17, frictionally engages the inner surface of the recess 17 to properly hold the knob or handle 16 in position. The inside of the knob 16, near the top thereof, is shouldered as at 24 to engage whichever surface 11 or 12 is arranged within the knob.

The initial roughly rolled dough sheet is indicated by the numeral 25 in FIGURE 3 and is arranged on a suitable board or other supporting surface 26 for the rolling of the sheet by a conventional rolling pin 27. The sheet is rolled to approximate thickness only slightly yet definitely greater than the desired final thickness of the dough sheet. The operator will then grasp the knob 16 and press the surface 11 or 12 downwardly against the dough as suggested in FIGURE 3, and the projection 13 or 14, whichever is used, will gauge the depth of penetration of the depression-forming end of the body into the dough. These depressions in FIGURE 3 are indicated by the numeral 29, and centrally of the area of each depression there will be a very small hole 30 punctured through the dough by the gauging element 13 or 14. The bottoms of the depressions 29 will be flat and in a common plane parallel to the surface of the board 26.

The depressions 29 are formed at spaced intervals over the area of the dough sheet and within the areas of the depressions 29, the dough sheet will be of identical thickness, which thickness is the desired predetermined thickness of the final dough sheet before the cutting of the cookies.

After the depression-forming operation has been completed, the device is laid aside and the rolling pin 27 again brought into operation to further roll the dough, this rolling operation being carried out to reduce the thickness of the dough progressively, and the final result will be the complete disappearance of the depressions 29. Slight deformity of the dough in the depressions by the rolling operation will close the small openings 30. In FIGURE 4, the final rolling operation has been shown completed throughout that portion of the area of the dough sheet toward the operator, and the remaining rolling operation will reduce the thickness of the dough sheet throughout the remainder of the area thereof.

The final rolling operation is carried out until all of the depressions 29 have just disappeared, at which time, the entire area of the dough sheet will be uniformly of the desired thickness of the cookies to be cut from the sheet. When such rolling operation has been completed, the cookie cutter is brought into operation to cut the individual cookies. As stated, cookie cutters of different shapes or outlines may be employed to provide cookies of as many different designs as desired, but all of the unbaked cookies cut from the sheet will be of exactly the same thickness.

The cut cookies are then placed on a metal cookie sheet and the cookies baked in a conventional manner. Knowing the desired oven temperature and cooking time for cookies of a given type, the cookies may be baked and when removed from the oven, will be of uniform texture due to the uniformity in the thickness of the raw cut cookies. There will be no cookies overdone because they were too thin in their cut form and there will be none underdone and of improper texture by having been cut from dough which is too thick. The method and device therefore facilitate in the making always of a batch of cookies which are uniformly baked. The use of the device in the manner shown in FIGURE 2 is very quickly carried out in a matter of seconds and accordingly does not appreciably lengthen the procedures followed in the cookie making.

It will be apparent that either end of the body 10 may be used to form the depressions in the dough sheet, and either end may be inserted in the recess 17 so that the gauging projection at the lower end of the body will determine the thickness of the dough sheet within the depressions 29. Either end of the body fits within the recess 17 and in either selected position, the O-ring friction element 23 will lie within the lower end of the recess 17 to hold the body in position with respect to the knob 16. This makes it extremely simple to cut cookies of different thicknesses depending upon the nature of the particular cookies to be baked.

It is to be understood that the steps in the method and the details of construction of the device are only exemplary as the invention has been illustrated or described, and that changes may be made in the steps of the method and in the details of construction of the device without departing from the spirit of the invention or the scope of the appended claims.

I claim:

1. The method of preparing dough sheets of predetermined thickness, which comprises rolling out a sheet of dough on a supporting surface to a thickness slightly greater than said predetermined thickness, forming at spaced points in such dough sheet depressions the bottoms of which are all spaced from the supporting surface a distance equal to said predetermined thickness, and then rolling the dough sheet to reduce it in thickness until all of the depressions just disappear.

2. The method of preparing dough sheets of predetermined thickness which comprises rolling out a sheet of dough on a supporting surface to a thickness slightly greater than said predetermined thickness, forming at spaced points in such dough sheet flat-bottomed depressions of appreciable area all parallel to the supporting surface and all spaced therefrom a distance equal to said predetermined thickness, and then rolling the dough sheet until all portions of the top area thereof lie in a plane coincident with said bottoms of said depressions.

3. The method of preparing dough sheets of predetermined thickness which comprises rolling out a sheet of dough on a supporting surface to a thickness slightly greater than said predetermined thickness, pressing a depression-forming implement having a flat dough-engaging face into the top of the dough sheet at spaced points and gauging the penetration of the flat face into the dough sheet so that the depressions formed therein will lie in a common plane parallel to and equidistantly spaced from the supporting surface a distance equal to said predetermined thickness, and then rolling the dough sheet so that all portions thereof lie in said common plane.

4. The method of preparing dough sheets of a predetermined thickness which comprises rolling out a sheet of dough on a supporting surface to a thickness slightly greater than said predetermined thickness, pressing into the top of the dough sheet at spaced points thereover a depression-forming implement having a flat dough-engaging face and a gauging element projecting therefrom to engage the supporting surface to limit downward movement of said implement to limit the penetration of the dough-engaging face of the implement so that the bottoms of the depressions will be parallel to and equally spaced from the supporting surface a distance equal to said predetermined thickness, and then rolling the dough sheet to deform the dough in the depressions to close the openings formed by said gauging element and to reduce the thickness of the dough until all areas thereof lie in a plane coincident with the plane of the bottoms of said depressions.

5. An implement for assisting in the formation of dough sheets of uniform predetermined thickness, comprising a body having at one end a flat surface of appreciable area and a gauging element projecting therefrom, and an operating knob carried by the other end of said body for exerting downward pressure on said body, whereby the pressing of said flat surface into the dough at spaced points will form flat-bottomed depressions all lying in a common plane equidistantly spaced from a supporting surface for the dough by engagement of said gauging element with said surface, the thickness of the dough sheet within said depressions representing said predetermined thickness and acting as a guide whereby further rolling of the dough sheet until the top surface of the dough sheet is in said common plane provides a dough sheet uniformly of said predetermined thickness.

6. An implement for assisting in the formation of a dough sheet of uniform predetermined thickness, comprising an elongated body having at one end a transverse flat surface of appreciable area, a gauging element of very small area projecting from said surface a distance equal to said predetermined thickness, and an operating knob carried by the other end of said body for exerting downward pressure on said body, whereby the pressing of said flat surface into the dough at spaced points will form flat-bottomed depressions all lying in a common plane equidistantly spaced from a supporting surface for the dough by engagement of said gauging element with such surface, the thickness of the dough in each depression being equal to said predetermined thickness to act as a guide for the further rolling of the top surface of the dough until such top surface lies in said common plane.

7. An implement for assisting in the formation of dough sheets of uniform predetermined thickness, comprising an axially elongated body having at one end a flat surface of appreciable area transverse to the axis of said body and a gauging element of very small area projecting axially from said flat surface and of a length equal to said predetermined thickness, an operating knob having an axial recess receiving the other end of said body, and a friction ring intermediate the ends of said body engaging in said recess to hold said body therein, downward force on said knob at spaced points over the dough sheet causing said flat surface to penetrate into the dough to form spaced flat-bottomed depressions all lying in a common plane equidistantly spaced from a supporting surface for the dough by the engagement of said gauging element with said supporting surface, said depressions forming guides whereby the dough may be rolled until all of the top surface thereof lies in said common plane whereby all of said dough sheet will be uniformly of said predetermined thickness.

8. An implement for assisting in the formation of dough sheets of uniform predetermined thickness, comprising an axially elongated body having at each end a flat surface of appreciable area and a gauging element projecting axially therefrom, said gauging elements being of different lengths, and an operating knob having an axial recess slidably and frictionally receiving either end of said body, downward force on said operating knob at spaced points over the dough sheet causing the flat surface below said knob to penetrate the dough to an extent limited by the length of the gauging element projecting from said last-named flat surface to form spaced depressions having flat bottoms all lying in a common plane equidistantly spaced from a supporting surface for the dough by engagement with said supporting surface of the gauging element projecting from said last-named flat surface, said depressions acting as guides whereby the further rolling of the dough may be carried out until all of the top surface of the dough sheet will lie in said common plane.

9. An implement in accordance with claim 8 wherein said axial recess has a shoulder engaging the end of said body projecting thereinto to limit movement of said body axially relative to said knob, said body being provided centrally of its length with a surrounding friction ring engageable with said recess to hold said body in position with respect to said knob.

10. An implement for assisting in the formation of dough sheets of uniform predetermined thickness, comprising a body having at one end a flat surface of appreciable area and a gauging element projecting therefrom, and an operating knob carried by the other end of said body for exerting downward pressure on said body, whereby the pressing of said flat surface into the dough at spaced points will form flat-bottomed depressions, means for limiting penetration of the dough sheet by said flat surface whereby all of said depressions will lie in a common plane equidistantly spaced from a supporting surface for the dough, the thickness of the dough sheet within said depressions representing said predetermined thickness and acting as a guide whereby further rolling of the dough sheet until the top surface of the dough sheet is in said common plane provides a dough sheet uniformly of said predetermined thickness.

References Cited by the Examiner
UNITED STATES PATENTS

| 1,534,907 | 4/1925 | Broecker | 107—50 |
| 2,543,682 | 2/1951 | Warfel | 107—47 |

WALTER A. SCHEEL, *Primary Examiner.*

J. SHEA, *Assistant Examiner.*